Jan. 13, 1959 H. FORWALD 2,868,030
DEVICE FOR TRANSFORMING A ROTARY MOVEMENT
TO A LINEAR MOVEMENT
Filed Dec. 31, 1956
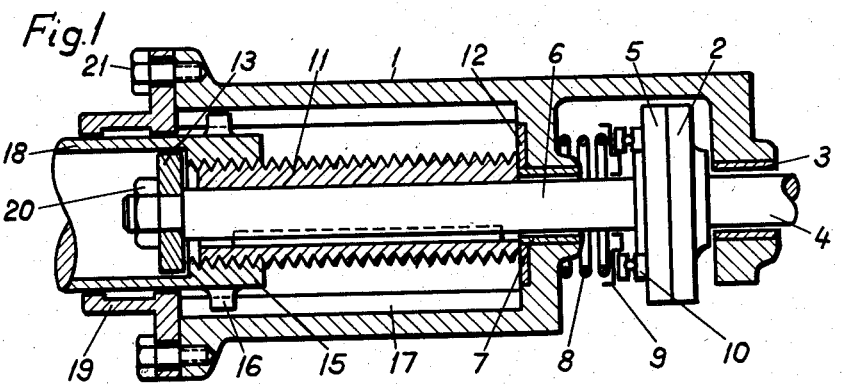
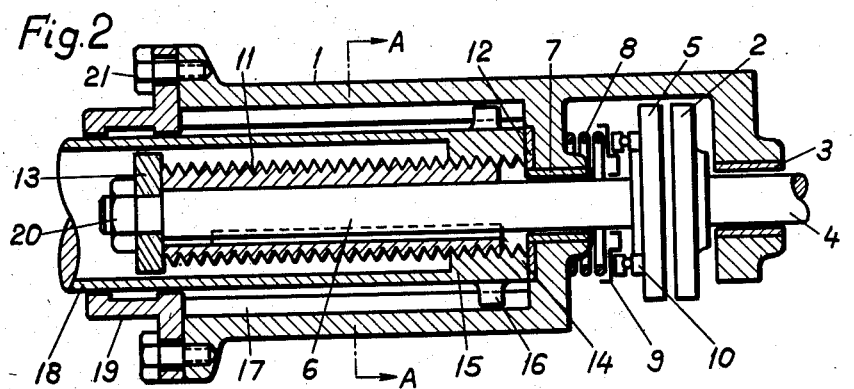
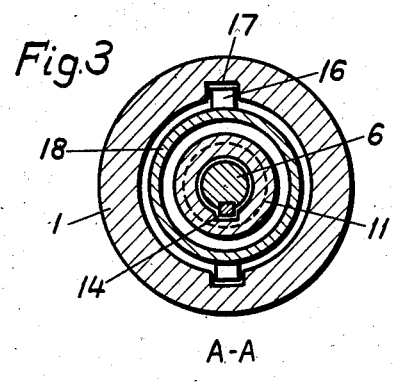
INVENTOR.
Haakon Forwald
BY
Attorney.

2,868,030

DEVICE FOR TRANSFORMING A ROTARY MOVEMENT TO A LINEAR MOVEMENT

Haakon Forwald, Ludvika, Sweden, assignor to Allmanna Svenska Elektriska Aktiebolaget, Vasteras, Sweden, a Swedish corporation Application December 31, 1956, Serial No. 631,791

3 Claims. (Cl. 74—424.8)

The present invention relates to a device for transforming a rotary movement to a linear movement by means of a screw connected to driving means over a friction clutch, which screw by its rotation moves a nut in its axial direction. The device according to the invention comprising a housing, a clutch plate attached to a driving shaft journalled in said housing, another clutch plate attached to one end of the driven shaft slidingly journalled in said housing and being pushed against the clutch plate on the driving shaft by spring means, an outside threaded sleeve slidingly fitted on said driven shaft but secured to the shaft against rotation by guiding means, and a nut surrounding said sleeve. The said threaded sleeve is arranged between a stop surface on a wall of the housing and a ring on the driven shaft, which stop surface and ring is limiting the axial movement of the sleeve. The nut is provided with outstanding parts extending into guiding means in the housing, which prevent the nut from rotating. The nut is moved axially in one or the other direction, depending upon the direction of rotation of the threaded sleeve, and is at its end positions extending out over the ends of the sleeve and is then forced against either the stop surface in the housing or the ring on the shaft whereby the sleeve is forced against either the said ring or surface. The driven shaft and the disc secured to it are then moved away from the disc secured to the driving shaft.

The device according to the invention is especially useful for motor operated disconnecting switches for effecting a quick opening and closing movement of the switch blade, which movement at the end positions of the switch blade shall be abruptly stopped. The abrupt stopping of the movement is obtained by separating the clutch plates so that no torque is transmitted through the clutch. This separating of the clutch plates is carried out at the end positions of the nut, when the nut and the sleeve are in contact with the stop surface of the housing and the ring on the shaft so that a further turning of the sleeve causes an increase of the distance between said ring and stop surface.

Through the new device it is achived that the driving motor may be still connected in and may run after the switch blade has reached its end positions, without damaging any power transmitting members of the device. Through this it is not necessary to stop the motor at a very exact moment but it may be braked softly after the switch blade has reached the end positions. The stress will then be low and the device can be given small dimensions. Another advantage is that the clutch in the device may be used as a brake, so that no separate brake for the motor will be necessary.

Figs. 1 and 2 are longitudinal sections through the device. In Fig. 1 the clutch plates are firmly held against each other. In Fig. 2 one of the shafts with its clutch plate is moved axially by the nut, and the sleeve and thus the clutch plates are separated. Fig. 3 is a section on the line A—A of Fig. 2.

In the figures 1 is a housing in which an operating mechanism and a clutch are arranged. The clutch comprises an axially fixed clutch plate 2 and an axially movable clutch plate 5. The clutch plate 2 is attached to a shaft 4, which is journalled in the sleeve 3 inserted in the housing 1, and driven by a motor not shown. The clutch plate 5 is attached to the end of a shaft 6, which is slidingly and rotatably journalled in the sleeve 7 in the housing 1. The spring 8 arranged between the housing 1 and the plate 9, through the thrust bearing 19 actuates the clutch plate 5 in direction against the clutch plate 2. In the mechanism there is an externally screw threaded sleeve 11 slidingly fitted on the shaft 6 but prevented from rotation by means of a key 14 and key grooves in the shaft and in the sleeve. The movement of the sleeve 11 is limited by the stopping disc 12 in the housing 1 and the flange of a ring 13 attached to the outer end of shaft 6 by means of the nut 20. Surrounding the sleeve there is a nut 15 secured against rotation by the outwardly projecting parts 16 guided by the grooves 17 in the housing 1. The tube 18 connected to the nut 15 actuates members not shown for instance a switch blade of a disconnecting switch. The collar 19 attached to the housing 1 by means of screws 21 is guiding the tube 18.

The device works as follows. Normally in the rest position the clutch plates are held firmly against each other as shown in Fig. 1. The clutch is then able to transmit a torque from a driving motor to the shaft 6. At the starting of the motor the shaft 6 and the sleeve 11 revolve and the nut is screwed along the sleeve to the right until it comes into contact with the stopping disc 12. When the sleeve then is further turned the nut presses the sleeve away from the disc 12 whereby it is forced against the flange of the ring 13. The shaft 6 and the clutch disc 5 is then moved away from the clutch disc 2 so that the parts of the device will get the positions shown in Fig. 2. No torque can now be transmitted through the clutch and the movement of an operated device stops.

By the invention it is achieved that an operated device may be moved to its end position with full speed and may be stopped there abruptly, as the motor and other power transmitting members having large kinetic energy are automatically disconnected. The said energy can for this reason be destroyed after the operated member has reached its end positions.

Suitably the pitch is so high that the screw is not self-locking. The spring 8 is then producing a torque in the mechanism which torque will turn the sleeve 11 and the shaft 6 in such a direction that the shaft 6 and the clutch plate 5 attached to it will move against the clutch plate 2 when both clutch plates are apart. When the clutch plate 2 revolves, the clutch 5 will get a position where the torques produced by the spring force and by the friction force between the discs 2 and 5 are alike. As there are always energy losses in the clutch when one of its discs revolves, the clutch may be used for braking the driving motor after an operation.

The invention is of course not limited to the described embodiment but can be modified in many ways. For example the nut may be provided with pins extending out through guiding slots in the walls of the housing. The member to be driven can then be connected to said pins.

I claim as my invention:

1. A device for transforming rotary motion into linear motion, comprising a housing, a driving shaft journalled in the housing, a driving clutch member attached to the said shaft, an axially movable driven shaft journalled in the housing, a driven clutch member attached to the driven shaft, spring means pressing the driven clutch member into engagement with the driving clutch member, an externally screw-threaded sleeve mounted to rotate with the driven shaft and having limited axial movement thereon, a nut member engaging the screw thread of said sleeve, means arranged between the housing and the nut member to prevent rotary movement of the nut member and to permit axial movement thereof within the housing, and means attached to the nut member and extending beyond the housing to transmit the linear motion transformed from the rotary motion of the driving shaft.

2. A device according to claim 1, having annular stop members mounted in the housing and on the driven shaft in spaced relation to each other for engagement with the ends of the screw threaded sleeve to limit the axial movement thereof.

3. A device according to claim 1, comprising a collar mounted on the housing at the end thereof remote from the clutch members, and serving as a guide for the said linear motion transmitting means extending from the housing.

References Cited in the file of this patent

UNITED STATES PATENTS 2,504,018    Gibson et al. _____ Apr. 11, 1950